United States Patent

Yamasaki et al.

[11] Patent Number: 5,539,916
[45] Date of Patent: Jul. 23, 1996

[54] DMA CONTROL FOR CONTINUING TRANSFER TO INPUT/OUTPUT DEVICE IN A CYCLE STEAL MODE

[75] Inventors: Takashi Yamasaki; Sachie Kuroda, both of Itami, Japan

[73] Assignee: Mitsubishi Denki Kabushiki Kaisha, Japan

[21] Appl. No.: 116,303

[22] Filed: Sep. 3, 1993

Related U.S. Application Data

[63] Continuation of Ser. No. 592,162, Oct. 3, 1990, abandoned.

[30] Foreign Application Priority Data

Oct. 5, 1989 [JP] Japan ................................... 1-260638

[51] Int. Cl.[6] ................................................. G06F 13/28
[52] U.S. Cl. .......................... 395/842; 327/339; 327/352; 364/DIG. 2
[58] Field of Search ............................ 364/200 MS File, 364/900 MS File, DIG. 2; 395/425, 842; 327/339, 352, 361

[56] References Cited

U.S. PATENT DOCUMENTS

| | | | |
|---|---|---|---|
| 4,378,589 | 3/1983 | Finnegan et al. | 395/310 |
| 4,451,884 | 5/1984 | Heath et al. | |
| 4,455,620 | 6/1984 | Watanabe et al. | 395/847 |
| 4,514,823 | 4/1985 | Mendeson et al. | 395/822 |
| 4,528,626 | 7/1985 | Dann et al. | |
| 4,530,053 | 7/1985 | Kriz et al. | |
| 4,975,832 | 12/1990 | Saito et al. | 395/843 |
| 5,003,465 | 3/1991 | Chisolm et al. | 395/845 |

*Primary Examiner*—Tod R. Swann
*Assistant Examiner*—James Peikari
*Attorney, Agent, or Firm*—Townsend and Townsend and Crew

[57] ABSTRACT

A DMA control system continuously grants permission to access the I/O device and memory to continue data transfer in a cycle steal mode when there is a continuous stream of DMA requests from a number of I/O devices by producing a logical sum of the DMA requests.

11 Claims, 4 Drawing Sheets

DMA CONTROL FOR CONTINUING TRANSFER TO INPUT/OUTPUT DEVICE IN A CYCLE STEAL MODE

This is a continuation of application Ser. No. 07/592,162, filed Oct. 3, 1990, now abandoned.

BACKGROUND OF THE INVENTION

1. Field of the Invention

The present invention relates to direct memory access (DMA) controllers for directly transferring data between memory and input/output (I/O) devices without using any central processing unit (CPU) in an information processor.

2. Description of the Prior Art

In general, it is a waste of time to output data to an I/O device from memory by means of a CPU. One of the fast ways to output data to an I/O device from memory is to directly output data to an I/O device from the data bus. Such DMA requires some hardware, which is called "DMA controller," for supplying addresses and control signals for transferring data to read or write in the memory or I/O device. Like the CPU, the DMA controller generates addresses to read or write in the memory and sends various control signals to the I/O device.

FIG. 3 shows a conventional DMA control system which includes an information processing unit 1 such as a CPU of an electronic computer; a random access memory (RAM) 2; a 4-channel address output device 3; four I/O devices 12; a bus access controller 14; data, address, and control buses 4, 5, and 6 for interconnecting the CPU 1, the address output device 3 the RAM, and the I/O device 12; and a DMA controller 7. The RAM 2 is a dynamic RAM which requires periodic refreshing. Four channels are assigned to the I/O devices 12 corresponding to the channels 0–3 of the address output device 3. The DMA controller 7 includes a transfer counter 9, a request signal generator 10, and a transfer pulse generator 11. The request signal generator 10 is composed of flip-flops such as bistable multivibrators.

The operation will be described with reference to FIG. 4. First of all, one of the I/O devices generates a DMA request signal $\overline{DRQ}$ (No. 1) for data transfer with the RAM 2. This is a negative logic signal and is represented by $\overline{DRQ}$. When the waveform of the request signal $\overline{DRQ}$ is shaped in the transfer pulse generator 11 and applied to the request signal generator 10, the request signal generator 10 outputs a positive logic bus request signal BRQ to the bus access controller 14. If there is neither DRAM refresh request r with high interrupt priority nor external HOLD request, the bus access controller 14 sends bus available signals $\overline{BAK\text{-}A}$ and inverted BAK-B to the DMA controller 7 and the CPU 1, respectively. That is, upon reception of the request signal BRQ, it generates a bus available signal BAK, the duration of which is determined by the machine cycle. The CPU 1 then cuts off the data bus 4, the address bus 5, and the control bus 6 to stop the use of data from the RAM 2. The DMA controller 7, on the other hand, outputs to the address output device 3 an acknowledge signal $\overline{DAK}$ indicating that the buses 4–6 are available. The requesting I/O device 12 identified by the address output device 3 then starts DMA transfer with the RAM 2 via the buses 4, 5, and 6.

If the bus available signal $\overline{BAK}$ is kept to be L, the DMA transfer is carried out in the burst mode. However, since L of the signal $\overline{BAK}$ is applied to the reset (R) of the request signal generator 10, the signal BAK becomes H at the end of a machine cycle, and the bus request signal BRQ from the request signal generator 10 is inverted to L. Consequently, it cancels the bus available signal BAK and outputs a H signal immediately after one machine cycle which is inherent to the system. Thus, the operation enters a cycle steal mode in which one byte of data is transferred in the machine cycle. When a DMA request signal $\overline{DRQ}$ is outputted from the channel No. 0 of the I/O device after the bus use permit is transferred to the CPU 1, one byte of data is transferred in the same way as described above.

When a refresh request r is inputted during the DMA transfer, the DMA controller 7 stops while the address output device 3 releases the buses 4, 5, and 6 for refreshing and resumes DMA transfer when the memory refresh is completed.

However, the conventional DMA controller requires a preparation period t necessary for the initial setting to effect data transfer within the period T in which the address output device 3 is given a bus use permit. Since this preparation period t is necessary for each transfer of one byte, the effective data transfer time is (T-t), resulting in the low bus efficiency. Thus, there is a waste of time on the bus for data transfer in the cycle steal mode.

SUMMARY OF THE INVENTION

Accordingly, it is an object of the invention to provide a DMA control system capable of continuously generating transfer cycles to eliminate the preparation period, thereby enhancing the bus efficiency.

In accordance with the invention there is provided a direct memory access control system which includes a central processing unit, a random access memory, a plurality of input/output devices, a plurality of buses for interconnecting the central processing unit to the random access memory and the input/output devices, and a direct memory access controller operable in a cycle steal mode in which the central processing unit is cut off from the buses while one of the input/output devices is connected to the buses for a machine cycle of the central processing unit (connection conditions). If there is a continuous stream of DMA requests the said I/O devices in the cycle steal mode, the connections of the buses will be maintained during a period of the continuous stream of DMA requests from the I/O devices in the cycle steal mode to carry out continuous data transfer between the memory and the I/O device.

When there is a continuous stream of DMA requests during transfer of a data unit determined by the machine cycle, the CPU continuously grants permission to the address output device to continuously perform direct data transfer between the RAM and the I/O device. When the DMA requests end, the control is returned to an ordinary cycle steal mode. In this way, it is possible to eliminate the preparation period which is otherwise necessary before data transfer in a cycle steal mode, thus resulting in increased DMA data transfer efficiency.

DESCRIPTION OF THE PREFERRED EMBODIMENT

Figure 1:
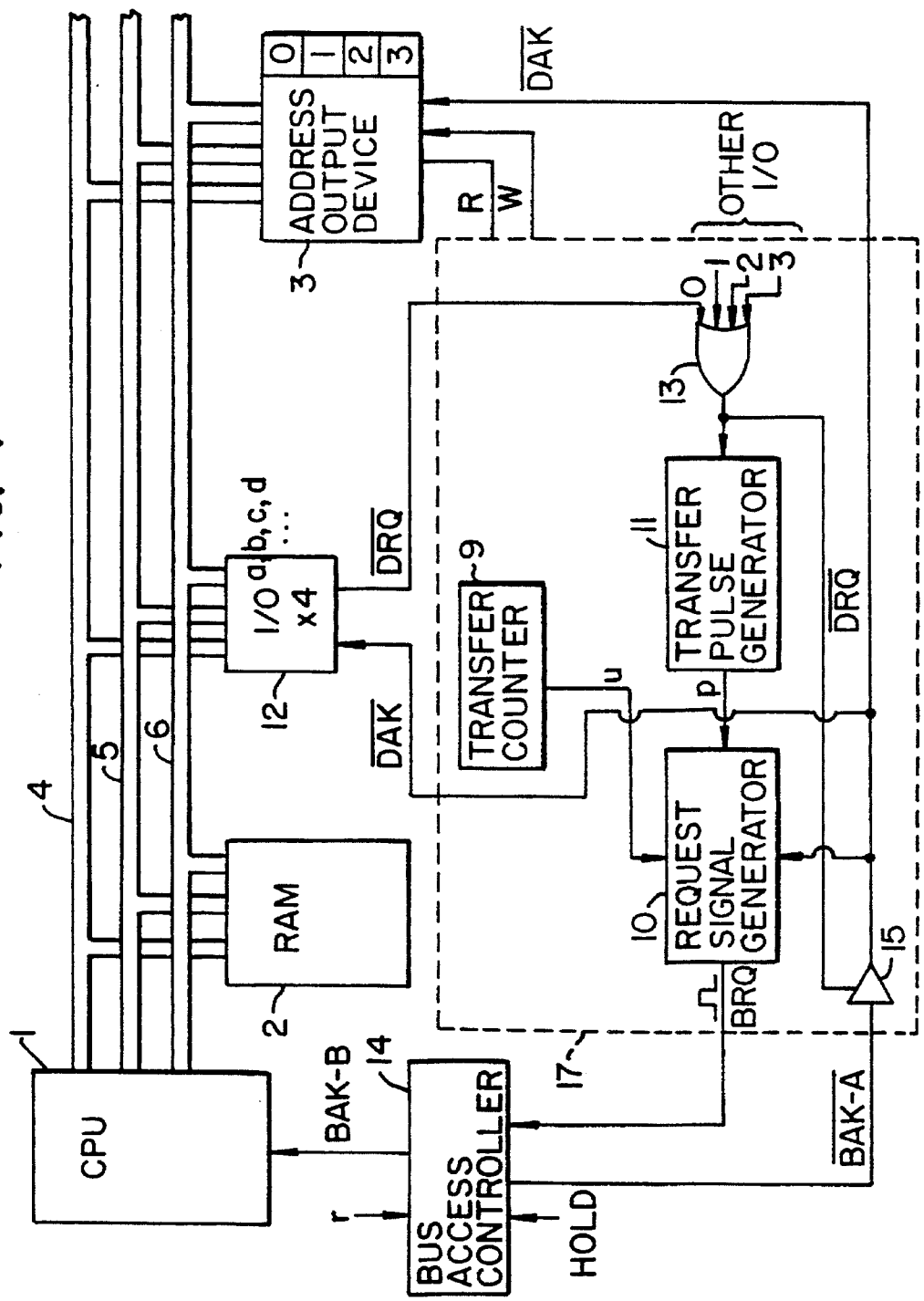
FIG. 1 is a block diagram of a DMA control system according to an embodiment of the invention.

FIG. 1 shows a DMA control system according to an embodiment of the invention. The DMA control system includes an information processing unit 1 such as a CPU of an electronic computer; a random access memory (RAM) 2; an address output device 3; a bus access controller 14; four I/O devices 12; data, address, and control buses 4, 5, and 6 for interconnecting the CPU 1, the address output device 3, the RAM 2, and the I/O device 12; and a DMA controller 17. The I/O devices 12 are controlled by respective channels 0–3 of the address output device 3. The RAM 2 is a dynamic RAM which requires periodic refreshing.

The DMA controller 17 includes a transfer counter 9 and a request signal generator 10. The request signal generator 10 is composed of flip-flops such as bistable multivibrators. The DMA controller 17 further includes a transfer pulse generator 11, a signal add circuit or OR gate 13, and a tristate buffer 15. The tristate buffer 15 is a gate which is normally on (conductive) and is turned off when the control signal is L.

Figure 2:
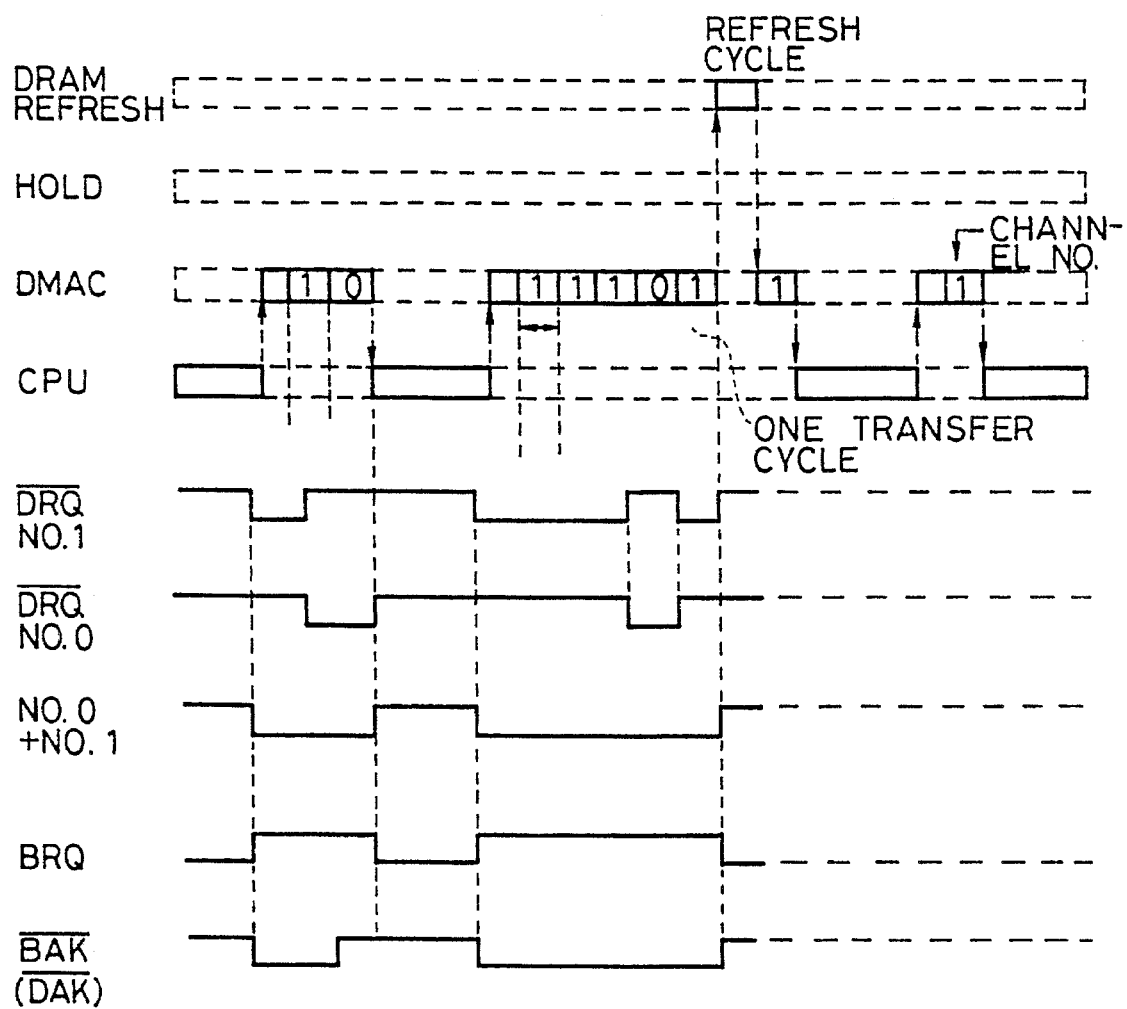
FIG. 2 is a timing chart useful for explaining the operation of the DMA control system of FIG. 1.
Figure 3:
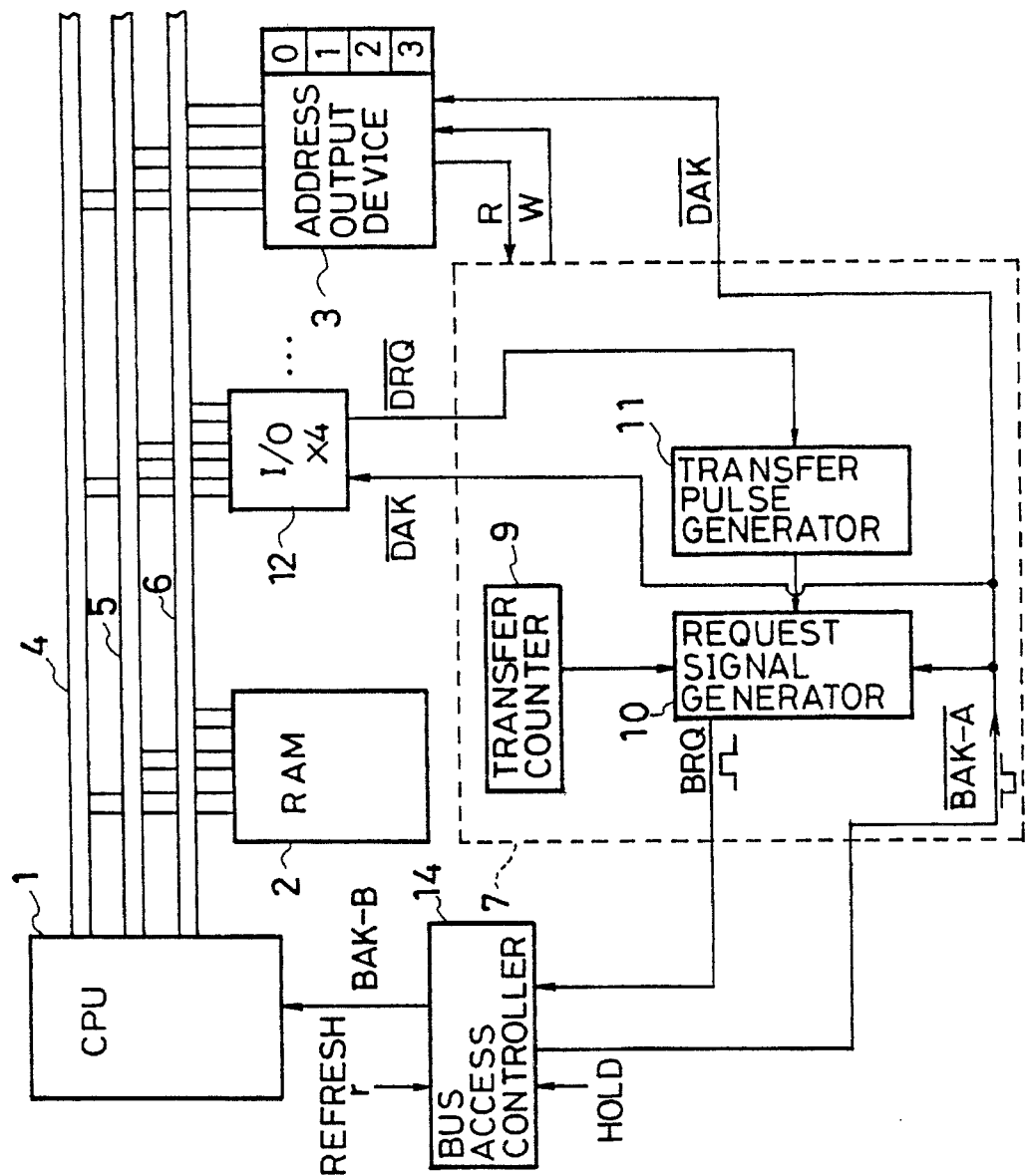
FIG. 3 is a block diagram of a conventional DMA control system.
Figure 4:
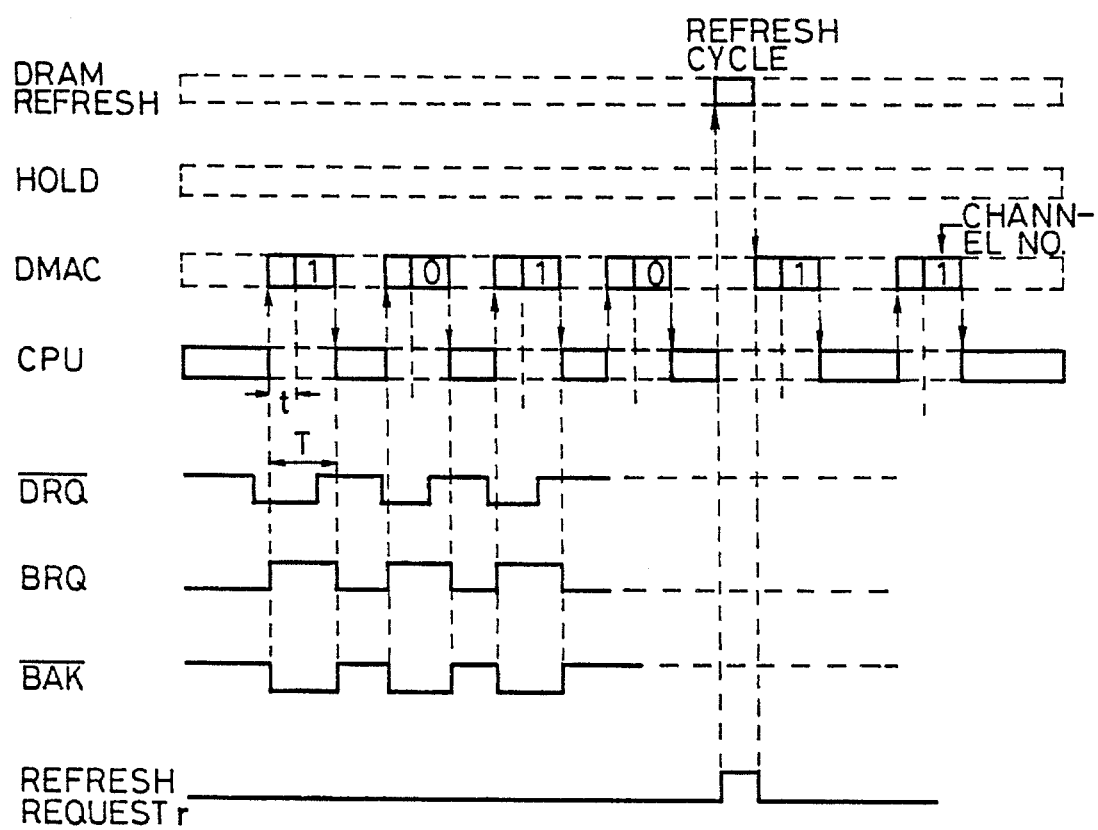
FIG. 4 is a timing chart useful for explaining the operation of the conventional DMA control system of FIG. 3.

The operation of the DMA control system will be described with respect to FIG. 2. First of all, a DMA request signal $\overline{DRQ}$ (No. 1) is outputted by one of the I/O devices 12a for requesting a DMA transfer. This DMA request signal $\overline{DRQ}$ is applied to the transfer pulse generator 11 via the OR gate 13. The transfer pulse generator 11 detects the falling edge and outputs a request pulse p to the request signal generator 10. The request pulse p triggers the request signal generator 10 to output a positive logic bus request signal BRQ to the bus access controller 14.

If there is neither DRAM refresh request r with high interrupt priority nor external HOLD request, the bus access controller 14 sends bus available signals $\overline{BAK\text{-}A}$ and BAK-B to the DMA controller 17 and the CPU 1, respectively, for a period determined by the machine cycle. The CPU 1 cuts off the data, address, and control buses 4–6 to stop the use of data from the RAM 2. This enables the DMA controller 17 to output to the address output device 3 an acknowledge signal $\overline{DAK}$ indicating that the buses 4–6 are available. The I/O device 12 of the channel designated by the address output device 3 starts transfer of data with the RAM 2 via the buses 4–6 after an initial setting period.

When a DMA transfer request signal $\overline{DRQ}$ (No. 0 request) is outputted from another I/O device, the OR gate 13 outputs the sum signal (No. 0+No. 1) of the request signal DRQ (No. 1) from the I/O device 12a and the request signal DRQ (No. 0) from the I/O device 12b. That is, it continuously outputs L. This signal L, which has little or no influence on the transfer pulse generator 11, is applied to the gate of the tristate buffer 15 so that the tristate buffer is turned off while the sum signal (No. 0+No. 1) is L.

As a result, the bus available signal $\overline{BAK}$ from the bus access controller 14 does not reach the request signal generator 10 even when it becomes H at the end of a machine cycle. The bus request signal BRQ is continuously H only when the sum signal (No. 0+No. 1) is L. Consequently, DMA transfer is carried out between the RAM 2 and the I/O device 12 in a mode similar to the burst mode until the transfer counter 9 counts up to the end.

When there is no DMA transfer request $\overline{DRQ}$ from both channels of the I/O devices 12a and 12b, the output of the OR gate 13 becomes H. This signal H is applied to the gate of the tristate buffer 15 to turn it on. H of the bus available signal $\overline{BAK}$ from the bus access controller 14 is applied to the reset (R) of the request signal generator 10 so that the bus request signal BRQ from the request signal generator 10 is inverted to L. In this way, the bus access controller 14 quickly cancels the bus available signal $\overline{BAK}$ and outputs H. Consequently, after a series of DMA transfers, the bus use permit is returned to the CPU.

Then, when another DMA request signal $\overline{DRQ}$ is outputted from the address output device 3, DMA transfer of a collection of data is carried out in the same way as described above as long as there are continuous requests. When the amount of transfer reaches the number of words preset in the transfer counter 9, a count up signal u forces the request signal generator 10 to stop the generation of a bus request signal even if the I/O devices 12a–12d continuously output DMA requests.

Thus, when DMA requests are provided continuously from the I/O devices 12, the cycle steal mode of a certain period is switched to a continuous transfer mode of a various period which is similar to the burst mode, thereby eliminating the preparation period in the data transfer initial period.

As has been described above, according to the invention, when there is a continuous stream of DMA requests in a cycle steal mode in which the CPU is cut off from the buses while the I/O device is connected to the buses during a machine cycle of the CPU, the bus connection conditions are maintained during the period of the continuous request to carry out continuous data transfer between the main memory and the I/O device designated by the address output device so that it is possible to eliminate a waste of time for initial setting which arises in the data transfer starting period in the cycle steal mode, thereby enhancing the data transfer efficiency and the entire function of the information processor.

We claim:

1. In a computer system having a central processing unit, a memory, a plurality of input/output devices and an address output device coupled to each other by a bus with a bus access controller supervising access to the bus by the central processing unit and the plurality of input/output devices, an improved direct memory access controller comprising:

a receiving circuit for receiving a DMA request signal from each of the plurality of input/output devices to produce a logical sum of said DMA request signals;

a request signal generator, coupled to said receiving circuit, for asserting a bus request signal to the bus access controller upon receipt of said DMA request signal and deasserting said bus request signal upon receipt of a bus acknowledge signal at a reset node, with said bus acknowledge signal generated by the bus access controller; and a tristate buffer having an input for receipt of said bus acknowledge signal, an output coupled to said reset node, and a control coupled to an output of said receiving circuit, said tristate buffer inhibiting said bus acknowledge signal from resetting said bus request signal when said logical sum is asserted, indicating that at least one of the plurality of input/output devices asserts its DMA request signal.

2. The direct memory access controller of claim 1 further comprising:

a transfer counter, coupled to said request signal generator, for asserting a transfer complete signal to said request signal generator when a predetermined amount of data has been transferred by the plurality of input/ output devices, said request signal generator deasserting said bus request signal when said transfer counter asserts said transfer complete signal.

3. In a computer system having a central processing unit, a memory, a plurality of input/output devices and an address output device coupled to each other by a bus with a bus access controller supervising access to the bus by the central processing unit and the plurality of input/output devices, an improved direct memory access controller comprising:

a receiving circuit for receiving a DMA request signal from each of the plurality of input/output devices to produce a logical sum of said DMA request signals;

a request signal generator, coupled to said receiving circuit, for asserting a bus request signal to the bus access controller upon receipt of said DMA request signal and deasserting said bus request signal upon receipt of a bus acknowledge signal at a reset node, with said bus acknowledge signal generated by the bus access controller; and switching means, coupled between the bus access controller and the receiving circuit and responsive to said logical sum, for inhibiting said bus acknowledge signal from resetting said bus request signal when said logical sum is asserted.

4. A direct memory access control system, comprising:

a bus for connecting a central processing unit and a memory;

a plurality of input/output devices coupled to said bus by means of a direct memory access controller to directly access said memory; and a transfer counter, coupled to said plurality of input/output devices, for counting a number of words to be transferred between said input/output devices and said memory;

wherein the direct memory access control system includes a cycle steal mode in which said central processing unit is disconnected from said bus during a machine cycle time preset by said central processing unit, and one of said plurality of input/output devices is connected to said bus to transfer a number of data words determined by said machine cycle; and means, coupled to said plurality of input/output devices and responsive to a direct memory access request from a second input/output device during said cycle steal mode, for maintaining the coupling between said bus and said second input/output device to carry out continuous data transfer between said memory and said second input/output device.

5. The direct memory access control system according to claim 4, wherein a time period for maintaining the connection between said bus and said second input/output device is limited to be within a time period for transferring the number of data words preset by said transfer counter.

6. A direct memory access control system, comprising:

a bus for connecting a central processing unit and a memory;

a plurality of input/output devices, each of which output a direct memory access signal and are coupled to said bus by means of a direct memory access controller to directly access said memory;

a transfer counter for counting a number of words to be transferred between said plurality of input/output devices and said memory;

a cycle steal mode in which said central processing is disconnected from said bus during a machine cycle time preset by said central processing unit, and one of said input/output devices is coupled to said bus to transfer a number of data words determined by said machine cycle;

a request signal generator, responsive to a DMA request signal from one of said I/O devices, for generating a bus request signal;

a bus access controller for outputting an inhibition signal for inhibiting said request signal generator from generating any bus request signals;

a signal add circuit for receiving a plurality of DMA request signals from one or more of said I/O devices and outputting a sum of said DMA request signals to said request signal generator; and a switching circuit provided between said bus access controller and said request signal generator which is turned off by the sum of said DMA request signals to shut off the inhibition signal so that continuous direct data transfer between said memory and one of said I/O devices is effected by shutting off the inhibition signal.

7. The direct memory access control system according to claim 6, wherein said transfer counter has a function to inhibit said request signal generator from generating any bus request signals when the number of transfer data reaches a predetermined amount.

8. The direct memory access control system of claim 6, wherein said signal add circuit is composed of an OR gate.

9. The direct memory access control system according to claim 6, wherein said switching circuit is composed of a buffer gate.

10. A DMA multimode transfer control, comprising:

means for receiving a DMA request signal from each of a plurality of input/output devices coupled to a system bus of a computer system to produce a logical sum of said DMA request signals;

means, coupled to an output of said receiving means, for controlling a bus request signal to a bus access controller coupled to said system bus, said controlling means asserting said bus request signal responsive to an assertion of said logical sum and deasserting said bus request signal responsive to receipt of a bus acknowledge signal provided by said bus access controller at a reset node; and means, coupled to said receiving means and responsive to said logical sum, for inhibiting said bus acknowledge signal from resetting said bus request signal when said logical sum is asserted.

11. A process for controlling DMA multimode transfers, comprising the steps of:

producing a logical sum of a plurality of DMA request signals, one DMA request signal from each of a plurality of input/output devices coupled to a system bus of a computer system;

asserting a bus request signal from a request signal generator to a bus access controller coupled to said system bus when said logical sum is asserted; and deasserting said bus request signal to said bus access controller when said bus access controller asserts a bus acknowledge signal to a reset node unless said logical sum is asserted to a control device between said reset node and said request signal generator to inhibit application of said bus acknowledge signal to said request signal generator as long as any of said plurality of input/output devices assert their DMA request signal.

* * * * *